United States Patent
Garrett et al.

[11] Patent Number: 5,845,809
[45] Date of Patent: Dec. 8, 1998

[54] PROTECTIVE COVER FOR A COMPRESSED GAS BOTTLE

[76] Inventors: James Kelly Garrett, 30532 Cantabarry, Roseville, Mich. 48066; Jimmy J. Pease, 24991 Harrison, Harrison Township, Mich. 48045; Michael B. Pearl, 35511 Pratt, Memphis, Mich. 48041

[21] Appl. No.: 884,451

[22] Filed: Jun. 27, 1997

[51] Int. Cl.⁶ .................................................. F16K 35/00
[52] U.S. Cl. ............................................................ 220/728
[58] Field of Search ..................................... 220/724, 725, 220/728, 4.23; 206/523, 588; 137/382

[56] References Cited

U.S. PATENT DOCUMENTS

| | | |
|---|---|---|
| 775,172 | 11/1904 | Hunt . |
| 1,017,265 | 2/1912 | McRae et al. . |
| 1,290,041 | 1/1919 | Anderson . |
| 1,948,966 | 2/1934 | Jaeger ..................................... 220/728 |
| 2,482,558 | 9/1949 | Scaringella . |
| 2,593,533 | 4/1952 | Cammarato ............................. 220/728 |
| 2,804,095 | 8/1957 | Schauenburg . |
| 3,078,108 | 2/1963 | Smith . |
| 3,154,211 | 10/1964 | Bobowski ........................... 220/728 X |
| 3,181,693 | 5/1965 | Freistat ..................... 206/523 |
| 3,246,793 | 4/1966 | Wade . |
| 3,641,697 | 2/1972 | Heidtman et al. ................... 206/523 X |
| 3,756,450 | 9/1973 | Crose, Jr. ................................ 220/724 |
| 3,848,768 | 11/1974 | Griffin .................................... 220/724 |
| 4,036,513 | 7/1977 | Loftus et al. . |
| 4,352,370 | 10/1982 | Childress ........................... 220/728 X |
| 4,478,345 | 10/1984 | Edinger . |
| 4,541,528 | 9/1985 | Holmes .............................. 220/4.23 X |
| 4,646,931 | 3/1987 | Andrews et al. . |
| 4,768,813 | 9/1988 | Timmons . |
| 4,881,562 | 11/1989 | Wright et al. ....................... 206/523 X |
| 4,915,424 | 4/1990 | Sarno et al. . |
| 5,022,685 | 6/1991 | Stiskin et al. . |

OTHER PUBLICATIONS

Portable Air Systems of "Scott Air–Paks" (TM), pp. 293, 299 of Jan. 1995 catalog of Lab Safety Supply, Inc. of Janesville, WI 53547.

Dive Cylinders descriptive information page of U.S. Divers Co., current catalog on the World Wide Web of the Internet.

Lockable Draw Catch Product V1843 of National Manufacturing Company, Sterling, IL 61081, dated 1995.

Roll Control System product of East Coast Plastics, Inc. of Ft. Lauderdale, FL 33304, advertisement in Sport Diver magazine, p. 113, May/Jun. 1997 issue.

*Primary Examiner*—Steven M. Pollard
*Attorney, Agent, or Firm*—Peter D. Keefe; William D. Blackman

[57] ABSTRACT

A cover for placement on a compressed gas bottle is dimensioned to closely conform to the shape and size of a top section of a compressed gas bottle with a control valve assembly installed thereon. The cover preferably includes a shell having first and second shell members connected by a living hinge, a plurality of clasps for holding the first and second shell members together in a closed configuration of the shell and a handle for carrying the cover and a compressed gas bottle to which it is closed upon. The upper portion of each of the first and second shell members are preferably lined with a resiliently compressible foam for cushioning against a control valve assembly of a compressed gas bottle. In a preferred embodiment of the cover, each of the first and second shell members has at least one friction band of a rubber or elastomeric material disposed therein for compressibly contacting a compressed gas bottle and thereby resisting slippage of the cover with respect to the compressed gas bottle. Feet may optionally be provided on the shell opposite the handle, to provide an abutment with a resting surface so as to resist rolling of the cover when it is placed sideways on the resting surface.

9 Claims, 2 Drawing Sheets

PROTECTIVE COVER FOR A COMPRESSED GAS BOTTLE

BACKGROUND OF THE INVENTION

1. Field of the Invention

The present invention relates to an apparatus for covering and protecting a compressed gas bottle. More particularly, the present invention relates to an apparatus for covering the upper section of a compressed gas bottle so as to protect the control valve assembly thereof, which is normally the top end of the bottle when it is disposed in an upright position. The apparatus of the present invention is particularly suited for covering and protecting scuba diving tanks in storage and in transport thereof.

2. Description of the Background Art

Referring now to FIG. 1 of the Drawings, a prior art compressed gas bottle or tank for storing compressed air or other bottled gas is shown generally at 10. The terms "tank" and "bottle" will be used interchangeably throughout this specification to refer to the same thing. In general, the term bottle is used to refer generically to a container for holding any compressed gas, while the term tank is used to describe a container for holding compressed breathable air for use in scuba diving or in fire fighting. Compressed gas bottles (tanks) 10, per se, are known and commercially available.

The compressed gas bottle 10 has a side wall 12 which includes a rounded top 12a. A threaded bore (not shown) is formed coaxially in the rounded top 12a at a neck 12b, and a control valve assembly 14 is provided which is sealingly and threadably mounted in the threaded bore, to regulate controlled release of the gas housed within the bottle 10. Some compressed gas bottles, other than bottles used for scuba diving, are provided with one or more cylindrical collars 16 at the top section thereof The cylindrical collar 16, where used, may have threads formed on the outer surface thereof, and may accommodate a standard metal bullet-shaped cap 16a having internal threads formed inside the bottom edge thereof. The type of compressed gas bottle shown at 10 is in wide use today, in both private and in commercial applications.

One particular area in which this type of tank 10 is used is to house compressed air for scuba divers to breathe when they are underwater. It is common practice for scuba tanks to omit use of the cylindrical threaded collar 16. Accordingly, the standard metal gas bottle cap 16a cannot be used with a scuba tank which does not include a cylindrical collar 16. Control valve assembles 14 which are commonly used with scuba tanks include K-valves, DIN valves, and less commonly, J-valves. Steel scuba diving tanks are commonly made with a rounded bottom end, and therefore require a rubber or plastic tank boot 18 attached to the bottom thereof to make the base of the tank flat, in order to allow the tank to stand upright. Accordingly, where a tank 10 is shown in the remaining Figures, it should be regarded as optionally including the tank boot 18. Scuba tanks 10 have typical diameters ranging from, for example, about 3.2 inches to about 8.25 inches. Another area in which this type of tank 10 is used is for fire fighting personnel to wear on their backs when entering an area of hazardous air for supplying safe, breathable air.

However, due to the fact that the gas (ie., air) housed inside the tank 10 is under a great deal of pressure, which may be 3000 psi or more, any sharp striking or rough treatment of the control valve assembly 14 may cause it to rupture or to break off, resulting in a sudden and dangerous release of pressurized gas, which may forcefully launch the tank 10, the control valve assembly 14, or both, in an unexpected direction, causing possible damage to persons and/or property, as well as inconvenience and added expense to the tank owner. Clearly, an apparatus which will cover and protect the control valve assembly 14 is desirable from a safety perspective.

Accordingly, a need exists in the art to somehow provide a protective cover for secure placement over the top section of a compressed gas bottle, and in particular, a need exists for a protective cover which is dimensioned to fit on and protect the top section of a standard scuba tank.

SUMMARY OF THE INVENTION

The present invention is a cover for covering the upper section of a compressed gas bottle, protectively inclusive of the control valve assembly thereof.

The cover according to the present invention is dimensioned to closely conform to the shape and size of a top section of a compressed gas bottle with a control valve assembly installed thereon. The cover, generally, includes an outer shell which is bisected into two shell members: a first shell member and a second shell member which are mutually pivotally connected together by a hinge, and a latch mechanism characterized by selectively releasable fastening hardware for holding the first and second shell members together in a closed configuration tightly abutting a compressed gas bottle (tank).

The upper portion of the inner side of the first and second shell members are preferably filled with a resilient foam for providing cushioning with respect to the control valve assembly of the compressed gas bottle. Preferably, a handle is attached to the outer side of the shell to allow a user to carry a compressed gas bottle with the protective cover installed thereon. In the most preferred embodiment of the present invention, each of the first and second shell members of the shell has at least one friction band of a rubber or elastomeric material disposed on the inner side thereof for elastically compressing against the side wall of a compressed gas bottle to thereby frictionally interact therewith so as to resist slippage of the cover with respect to the bottle when installed thereon. Feet may, optionally, be provided on the outer side of the shell, opposite the handle, to resist rolling thereof when placed sideways on a flat surface.

Accordingly, it is an object of the present invention to provide an apparatus for removably and protectively covering a top section of a compressed gas bottle, including the control valve assembly thereof.

It is a further object of the present invention to provide a selectively removable protective cover for a compressed gas bottle which is usable to cover and protect a top section of a compressed air tank for scuba diving.

These, an additional features, objects and advantages of the present invention will become clear from the following specification.

DETAILED DESCRIPTION OF THE PREFERRED EMBODIMENT

Figure 1:
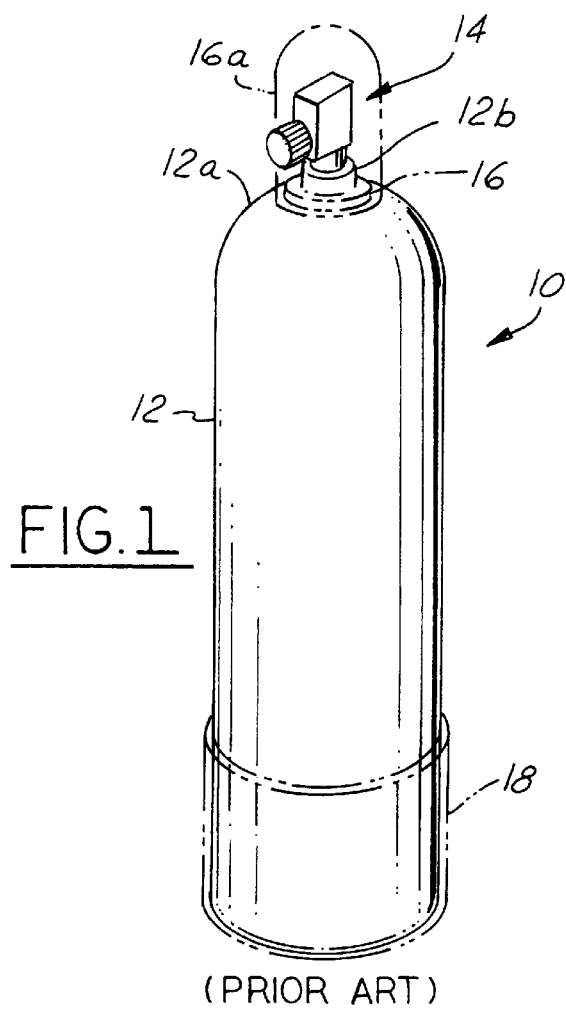
FIG. 1 is a perspective view of a prior art compressed gas bottle.

Referring again to the Drawings, as noted and discussed above in the background section, a prior art compressed gas bottle 10 includes a control valve assembly 14 installed thereon. The compressed gas bottle 10, as noted, is commercially available, and as such, does not form a part of the present invention. Instead, the present invention is intended to be used in conjunction with a conventional compressed gas bottle (tank) 10.

A cover 20 in accordance with the present invention is protectively installable on the top section 12c of a compressed gas bottle 10, inclusive of its control valve assembly 14. Generally speaking, the cover 20 covers an upper section 12c of the gas bottle 10 (see FIG. 2), but the exact proportion of the compressed gas bottle 10 which is covered may be greater or lesser than that shown. A preferred proportion of coverage is an area in a range of between about the top quarter and about top half of the compressed gas bottle 10, which provides a non-limiting meaning to the term 'upper section' as used herein.

The cover 20 hereof includes a rigid shell 22 which is formed in the general shape of a cylinder which is closed at its top end 24 and open at its bottom end 26. The shell 22 is formed from a tough, durable impact-resistant material such as a metal or, preferably, a non-brittle plastic. While rigidity of the shell 22 is important to thereby serve to protect the control valve assembly 14 from an untoward impact, a slightly resilient, impact-resistant plastic is most preferred so as to withstand shocks without cracking, splitting or breaking apart. The shell 22 is bisected into a first shell member 28 and a second shell member 30 which are mutually pivotally connected together by a hinge 32. The hinge 32 is preferred to be of the living hinge type, as shown, but may be of any conventional design, such as a hinge using a hinge pin. Accordingly, the first and second shell members 28, 30 are mutually pivotable via the hinge 32 from an open configuration, as shown at FIG. 2, to a closed configuration, as shown at FIG. 3.

Figures 2, 3, 4, 5:
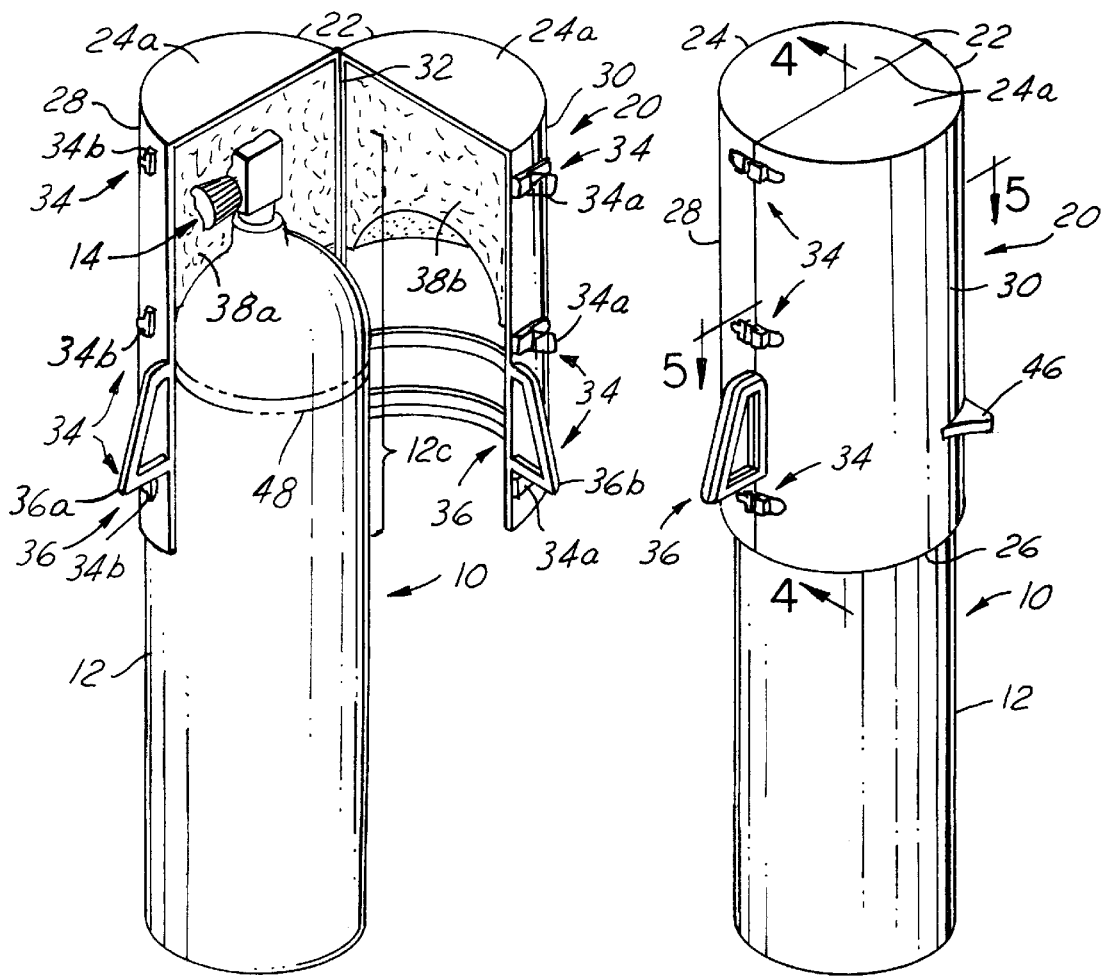
FIG. 2 is a perspective view of the cover according to the present invention, shown in operation with respect to a compressed gas bottle, wherein the cover is seen in an open configuration.
FIG. 3 is a perspective view of the cover according to the present invention, shown in operation with respect to a compressed gas bottle, wherein the cover is seen in a closed configuration.
FIG. 4 is a cross-sectional, partly broken away, view of the cover according to the present invention, taken along line 4—4 of FIG. 3.
FIG. 5 is a partly sectional view of the cover according to the present invention, shown in operation with respect to a compressed gas bottle, taken along line 5—5 of FIG. 3.

The bottom end 26 of the shell 22 provides a substantially circular opening when the shell 22 is in its closed configuration, so that the side wall 12 of a compressed gas bottle 10 is passable therethrough, as shown at FIG. 3. The top end 24 of the shell 22 is closed via two top components 24a, wherein each top component is integrally formed, respectively, with the first and second shell members 28, 30, and wherein when the shell is in the closed configuration, the top components conjoin to collectively form the closed top end of the shell. The top end 24 may be flat, as shown, may be round or may be any other desired shape.

A latch mechanism 34 composed of appropriate fastening hardware, such as clasps (buckles), are attached, such as by rivets or other fasteners, to the outer side 22a of the first and second shell members 28, 30 opposite the hinge 32 for holding the first and second shell members together in the closed configuration. The clasps which are shown in FIGS. 2, 3 and 5 are conventional and include a pivotal tensioning member 34a, connected with one of the first and second shell members 28, 30, which fits releasably into, and which is retained by, a hooked base member 34b connected with the other of the first and second shell members 30, 28. Many types of fastening hardware are known and understood by those in the art, and it will be understood that any type of known fastening hardware may be used, so long as it is structured to hold tightly closed the first and second shell members (an example of a suitable clasp, sans the lock structure, is a "Lockable Draw Clasp product No. V1843 of National Manufacturing Co., Sterling, Il. 61081.). Preferably, the latch mechanism 34 is composed of a plurality of clasps, three mutually spaced apart clasps being shown by way of preferred example.

A handle 36 for carrying the cover 20 and a compressed gas bottle 10 to which it is engaged is also preferably provided. The handle 36 is preferably integrally formed with the shell 22, but may be attached to the outer side 22a thereof by any suitable fastening modality. The handle 36 is preferably two component, wherein a first handle component 36a thereof is connected with the first shell member 28 and a second handle component 36b thereof is connected with the second shell member 30. The disposition of the first and second handle components 36a, 36b is such that when the first and second shell members 28, 30 are pivoted to the closed configuration, the first and second handle components 36a, 36b conjoin to collectively form the handle 36. As shown, the handle is preferred to have a grasping portion which is oriented at an acute angle to the longitudinal axis of the shell 22. The acute angle of the grasping portion is preferred so that when a user carries the cover 20 with a compressed air bottle 10, the angle of carry is consistent with an orientation of carry generally agreeable to the center of gravity, thereby lessening the tendency of the compressed gas bottle to slip out from the cover during carriage.

Figure 6:
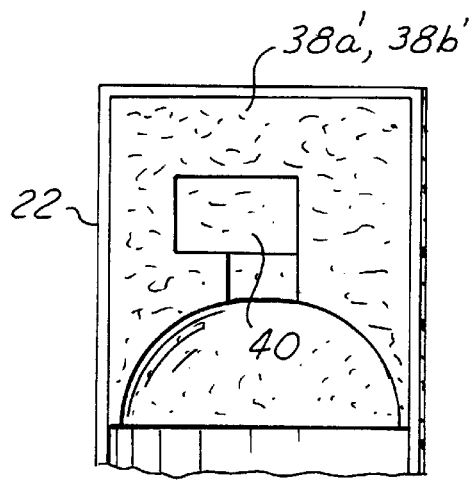
FIG. 6 is a cross-sectional, partly broken away, view of the cover according to the present invention showing an optional cut-out for accommodating a control valve assembly.

The inner side 22b of the upper portion of each of the first and second shell members 28, 30 is preferably provided, respectively, with a foam liner 38a, 38b. The foam liner 38a, 38b is formed from a relatively tough, yet resiliently compressible foam material. Many types of resiliently compressible foam are available for the foam liner 38a, 38b and are known to those skilled in the art. A preferred material for the foam liner 38a, 38b is a foam which does not have a compression memory (ie., resiliently returns to its original shape after being compressibly squeezed), such as for example neoprene foam. The foam liner 38a, 38b is attached to the inner side 20b of respective first and second shell members 28, 30 via a suitable adhesive, which may provide selectively releasable or permanent attachment. While it is most preferred for the foam liner 38a, 38b to compressibly receive the control valve assembly 12 (see FIG. 2), alternatively, as shown at FIG. 6, the foam liner 38a', 38b' may be provided with a cut-out 40 for receiving therein the control valve assembly 14 of a compressed gas bottle 10.

Figure 7:
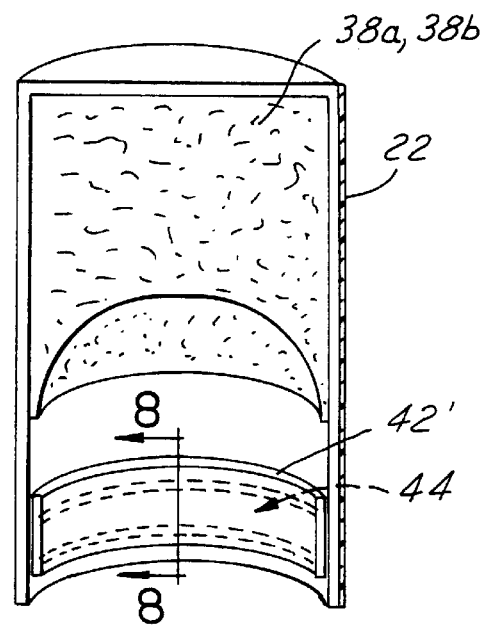
FIG. 7 is a partly broken-away side view of the inner side of the cover according to the present invention, showing a preferred structure for removingly affixing a friction band thereto.
Figure 8:
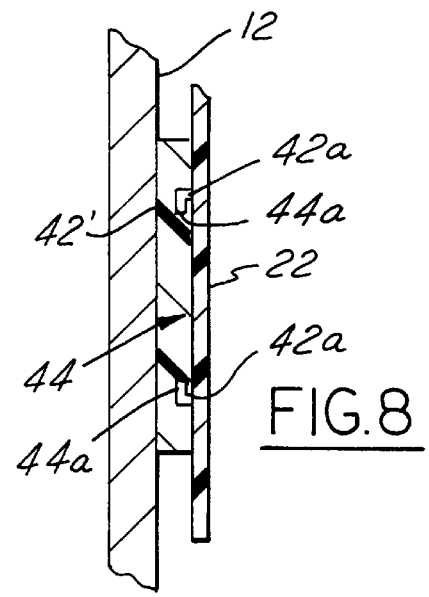
FIG. 8 is a broken-away, sectional end view of the cover according to the present invention, seen along line 8—8 in FIG. 7.

In the preferred embodiment of the cover 20, at least one friction band 42, and preferably two friction bands of a rubber or elastomeric material is affixed to the inner side 22b of the first and second shell members 28, 30. While it is possible to dispose the friction bands 42 in any orientation, it is preferred to dispose the friction bands substantially transverse to the longitudinal axis of the cover 20. Examples of suitable materials for the friction bands 42 are silicone elastomers, latex, and neoprene. Preferably, the friction bands 42 are on the order of at least one-quarter inch thick to promote a elastically compressive abutment with the side wall 12 of a compressed gas bottle 10 when the shell 22 is in the closed configuration whereby frictional gripping of the side wall resists slippage of the cover with respect to the compressed gas bottle. The preferred friction bands 42 are bifurcated into a first band element affixed to the first shell member 28 and a second band element affixed to the second shell member 30, the bifurcation being at the hinge 32. The friction bands 42 may be attached to the inner side 22b via a suitable adhesive or two sided adhesive tape, which may be selectively releasable or permanent. Alternatively, as shown at FIGS. 7 and 8, the friction bands 42' may be removably interfaced with the inner side 22b of the shell 22 via flanges 42a which slidably engage a seat 44 having lips 44a formed in the inner side of the first and second shell members 28, 30, respectively. In this regard, the friction bands 42' may be slipped in and slipped out of the seat 44, thereby facilitating periodic replacement of the friction bands. In the event the bands 42, 42' do not supply sufficient frictional interaction with the side wall 12 of the compressed gas bottle 10, a conventional tape 48 (such as for example duct tape) may optionally be applied to the side wall 12 of the compressed gas bottle to thereby provide an abutting interaction with the friction bands (see FIG. 2).

A pair of feet 46 are preferably provided at the outer side 22a of the first and second shell members 28, 30 opposite the handle 36, as shown in FIGS. 3 and 5, to thereby stabilize the cover 20 and the compressed gas bottle 10 vis-a-vis rolling when laid down on its side.

In operation, a user pivots the first and second shell members to the open configuration, then places the upper section of a selected compressed gas bottle (tank) so that the control valve assembly thereof rests safely and protectively into the foam liner. Preferably, the foam liner has a curved bottom terminous which is shaped to correspondingly abut the rounded top of the compressed gas bottle. The user then pivots the first and second shell members into the closed configuration of the shell, whereupon the inner side of the shell abuts tightly against the sidewall of the compressed air tank. In particular, the friction bands are caused to compressibly engage the sidewall as the clasps are tensionally closed, thereby rendering slippage of the compressed air bottle from the cover a most unlikely event. The user may now carry the cover and the compressed gas bottle and then lay it down so that the feet prevent it from rolling around on a resting surface. It is to be noted, in that there are many sizes of compressed air bottle (see the range hereinabove recounted), the shell is dimensioned commensurately to tightly engage a selected size of sidewall.

The compressed gas bottle is removed from the cover by simply releasing the clasps and pivoting the first and second sidewalls to the open configuration of the shell.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

What is claimed is:

1. A cover for being installed in a tightly engaged fit with respect to an upper section of a compressed gas bottle, protectively inclusive of a control valve assembly thereof, said cover comprising:
   a shell comprising:
      a first shell member having an inner side, an outer side and a first top component;
      a second shell member having an inner side, an outer side and a second top component; and
      hinge means for pivotally connecting together said first and second shell members, wherein said first and second shell members are pivotable on said hinge between an open configuration of the shell and a closed configuration of the shell, wherein said shell has a closed top formed by conjoinder of said first and second top components when said shell is in said closed configuration, and wherein said shell has an open bottom when said shell is in said closed configuration;
   friction band means affixed to said inner side of said first and second shell members for compressible abutting a compressed gas bottle disposed in said shell when said shell is in said closed configuration so as to resist slippage of said cover with respect to the compressed gas bottle, wherein said shell is held to the compressed gas bottle only by action of the compressible abutment of said shell with respect to the compressed gas bottle; and
   means for selectively holding said first and second shell members in said closed configuration.

2. The cover of claim 1, further comprising a resiliently compressible foam liner affixed to said inner side of each of said first and second shell members, said foam liner being disposed generally adjacent said first and second top components, respectively.

3. The cover of claim 2, wherein said foam liner has a hollow recess formed therein for receiving a control valve assembly of a compressed gas bottle.

4. The cover of claim 1, further comprising a handle attached to said shell for allowing a user to carry a compressed gas bottle with the cover installed thereon.

5. The cover of claim 4, wherein said handle comprises:
   a first handle component connected with said first shell member; and
   a second handle component connected with said second shell member;
   wherein said first and second handle components conjoin when said shell is in said closed configuration to thereby collectively form said handle.

6. The cover of claim 5, wherein said handle further comprises a grasping portion, said grasping portion being oriented at a preselected acute angle with respect to a longitudinal axis of said shell.

7. The cover of claim 1, wherein said holding means comprises a plurality of clasps, each clasp of said plurality of clasps being in part connected to each of said first and second shell members.

8. The cover of claim 1, further comprising foot means connected with said shell substantially opposite said handle for rollably stabilizing said cover when placed sideways on a resting surface.

9. The cover of claim 1, wherein said hinge means comprises a living hinge formed integrally of said first and second shell members.

* * * * *